Jan. 27, 1970 J. A. MANISCALCO 3,491,725
CURRYCOMB
Filed June 21, 1968
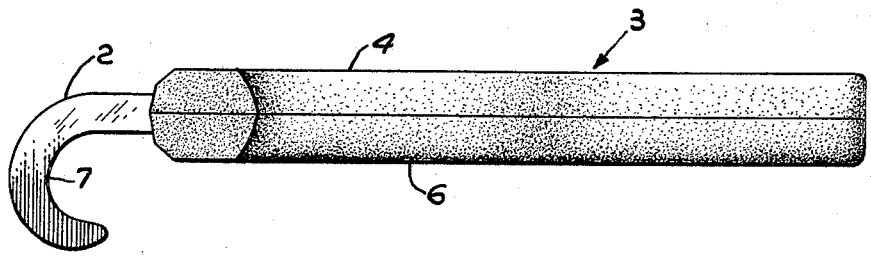
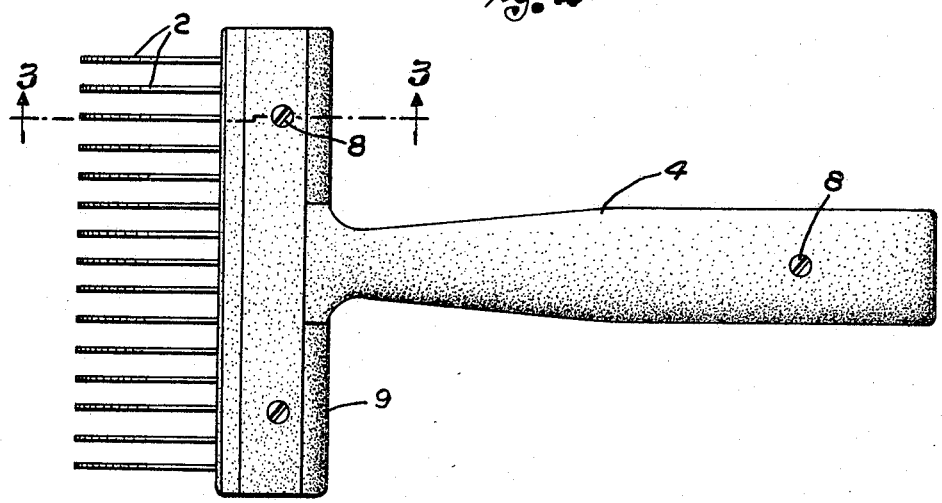
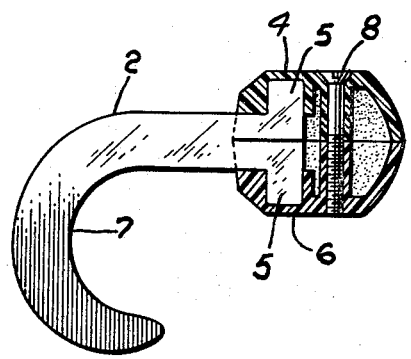
INVENTOR.
JOSEPH A. MANISCALCO United States Patent Office 3,491,725
Patented Jan. 27, 1970

3,491,725
CURRYCOMB
Joseph A. Maniscalco, 200 Hawthorne Ave.,
Staten Island, N.Y. 10314
Filed June 21, 1968, Ser. No. 739,115
Int. Cl. A01k 13/00
U.S. Cl. 119—86                               4 Claims

ABSTRACT OF THE DISCLOSURE

A currycomb grooming tool is described in which a plurality of arcuate blades are mounted in parallel in a rounded T-shaped handle. The blades are curved to form an arc of approximately 180°.

Background of the invention

The invention is directed to the field of currycomb grooming tools such as are used in the care of animals. The invention is expecially valuable in the care and grooming of long-haired animals such as horses and long-haired canines such as long-haired poodles, terriers and toy breeds.

In the prior art of animal currycomb grooming tools it is known to use straight or slightly curved blades. The known prior art includes grooming tools in which the handle is mounted at a right angle to the longitudinal direction of the blades.

Grooming tools of the field of the invention are directed to the removal of tangles and knots of hair from animals and the raising of matted hair.

Many grooming tools are so constructed so that their normal usage is most efficient if used by right handed persons.

A large number of grooming tools have the disadvantage of having sharp projections which endanger the animal if excessive pressure is exerted on the grooming tool or if the grooming tool is held at an improper angle The present invention is directed to providing a grooming tool which may be used by inexperienced personnel so that the animal will not be harmed by holding the grooming tool in an improper manner or by applying too much pressure.

The present invention utilizes a handle arrangement which facilitates comfortable use by either hand in a manner which allows easy control of the amount of pressure applied to the tool and animal.

Summary of the invention

In summary, the invention provides a grooming tool in which a plurality of arcuate blades are mounted in a T-shaped handle. The arcuate blades are formed in an arc of approximately 180° so as to provide safety for the animal. In this manner the tips of the blades will not penetrate the skin of the animal being groomed no matter how much pressure is applied to the handle of the grooming tool.

The T-shaped handle allows use of the grooming tool by either hand.

The removal of knots and tangled hair is facilitated by tapering the arc portion of the blades toward the inner arc so as to provide a sharpened edge for cutting.

The straight portion of the blades are formed with one or more projections to mate with the two handle portions so that the blades are firmly secured to the handle.

Brief description of the drawings

FIG. 1 is a side elevation of the grooming tool of the invention.
FIG. 2 is a top view of the grooming tool.
FIG. 3 is a partial cross sectional side elevation taken along line 3—3 of FIG. 2.

Description of the preferred embodiment

Referring to the figures in which like elements are identified with like numerals, a plurality of arcuate blades 2 are mounted in a handle 3 formed of an upper portion 4 and a lower portion 6 and a transverse end blade holding portion 9.

The straight portions of the blades 2 include protrusions 5 which are held securely by the transverse portion 9 of the formed upper and lower portions 4 and 6 by the securing members 8.

The arcuate portions of the blades 2 are formed to approximately 180° and are tapered or sharpened by being tapered toward the inner arc 7.

The thus sharpened and curved blades, when placed on an animal will cut and remove knots and tangles of hair with no danger to the animal, due to the extent of curve in the blades.

It is thus seen that the objects and advantages of the invention have been accomplished by the use of blades curved to an arc of approximately 180°.

What is claimed is:
1. A grooming tool comprising a T-shaped handle grip means including a transverse portion and a plurality of flat vertically positioned arcuate blades mounted at one end in the handle transverse portion and curved to form an arc of approximately 180°.
2. Apparatus according to claim 1 in which the blades are tapered toward the inner portion of the arc to provide a sharp edge for removing knots and tangles of hair.
3. Apparatus according to claim 1 in which the handle is formed of two pieces which mate so as to enclose and secure a portion of each of the blades.
4. Apparatus according to claim 1 in which the blades are formed with at least one lateral projection for assisting in the mounting of the blades within the handle.

References Cited

UNITED STATES PATENTS

| | | | |
|---|---|---|---|
| 1,014,250 | 1/1912 | Norman | 56—400.21 |
| 1,050,714 | 1/1913 | Barnard | 172—768 |
| 2,529,012 | 11/1950 | Gleekman | 119—86 |
| 2,961,996 | 11/1960 | Oliver | 119—86 |

ALDRICH F. MEDBERY, Primary Examiner

U.S. Cl. X.R.
56—400, 400.21